(12) United States Patent
Gardino et al.

(10) Patent No.: US 12,405,171 B2
(45) Date of Patent: Sep. 2, 2025

(54) ELECTRICAL CURRENT BASED TEMPERATURE SENSOR AND TEMPERATURE INFORMATION DIGITIZER

(71) Applicant: INVENSENSE, INC., San Jose, CA (US)

(72) Inventors: Daniele Gardino, Mortara (IT); Michele Folz, Pavia (IT); Antonio Aprile, Pavia (IT); Piero Malcovati, Pavia (IT); Raffaele Boi, Pavia (IT); Edoardo Bonizzoni, Pavia (IT)

(73) Assignee: INVENSENSE, INC., San Jose, CA (US)

( * ) Notice: Subject to any disclaimer, the term of this patent is extended or adjusted under 35 U.S.C. 154(b) by 786 days.

(21) Appl. No.: 17/359,866

(22) Filed: Jun. 28, 2021

(65) Prior Publication Data

US 2022/0412813 A1 Dec. 29, 2022

(51) Int. Cl.
*G01K 7/01* (2006.01)
(52) U.S. Cl.
CPC .................................. *G01K 7/015* (2013.01)
(58) Field of Classification Search
CPC ...... G01K 7/015; G01K 2219/00; G01K 7/01; G01K 7/00; G01K 7/021; G01K 7/14; G01K 7/16; G01K 7/21; G01K 7/25; G01K 15/005; G01R 31/2874; H03L 1/022
See application file for complete search history.

(56) References Cited

U.S. PATENT DOCUMENTS

| | | | |
|---|---|---|---|
| 9,048,860 B1 * | 6/2015 | Quinn | H03M 1/46 |
| 10,833,698 B1 | 11/2020 | Oliaei et al. | |
| 2007/0205916 A1 * | 9/2007 | Blom | G01K 7/01 |
| | | | 374/E7.035 |
| 2018/0149526 A1 * | 5/2018 | Abughazaleh | G01K 7/16 |

FOREIGN PATENT DOCUMENTS

| | | | | |
|---|---|---|---|---|
| CN | 112564710 A | * | 3/2021 | H03M 1/46 |
| EP | 2790470 A1 | * | 10/2014 | H02M 3/156 |

* cited by examiner

*Primary Examiner* — Catherine T. Rastovski
*Assistant Examiner* — Matthew W. Baca
(74) *Attorney, Agent, or Firm* — Amin, Turocy & Watson, LLP

(57) ABSTRACT

The described technology is generally directed towards an electrical current based temperature sensor and temperature information digitizer, referred to herein as a "temperature digitizer". The temperature digitizer can include a sensor core, a digital to analog converter, a current comparator, and a processor. The processor can be configured to perform multiple current comparisons using the sensor core, digital to analog converter, and current comparator, and the processor can generate a digital code that reflects the results of the multiple current comparisons. The digital code represents the temperature.

19 Claims, 7 Drawing Sheets

ELECTRICAL CURRENT BASED TEMPERATURE SENSOR AND TEMPERATURE INFORMATION DIGITIZER

TECHNICAL FIELD

The subject disclosure generally relates to temperature sensors, more particularly, to an electrical current based temperature sensor and temperature information digitizer.

BACKGROUND

Voltage bandgap temperature sensors, also referred to as silicon bandgap temperature sensors, are a common form of temperature sensor used in electronic equipment. The principle of such sensors is that the forward voltage of a silicon diode, which may be the base-emitter junction of a bipolar junction transistor (BJT), is temperature-dependent. The voltages of two BJT junctions at the same temperature, but at two different currents, can be compared, and the difference in voltage can be used to calculate the temperature.

Voltage bandgap temperature sensors have some drawbacks, however. Most notably, they use tiny voltage differences, often in the millivolt range, to measure temperature. As a result, voltage bandgap temperature sensors require a relatively high degree of precision to measure useful temperature information. To achieve the required precision, high gain side circuits and an overall high level of architectural complexity and sophistication is needed.

There is a need for temperature sensors that can achieve sufficient precision at lower cost and complexity than today's voltage bandgap temperature sensors.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

One or more aspects of the technology described herein are generally directed towards an electrical current based temperature sensor and temperature information digitizer, referred to herein as a "temperature digitizer", as well as methods of making and using the temperature digitizer. In some examples, temperature digitizers according to this disclosure can include a sensor core, a digital to analog converter, a current comparator, and a processor. The processor can be configured to perform multiple current comparisons using the sensor core, digital to analog converter, and current comparator, and the processor can generate a digital code that reflects the results of the multiple current comparisons. The digital code represents the temperature. Further aspects and embodiments are described in detail below.

Figure 1:
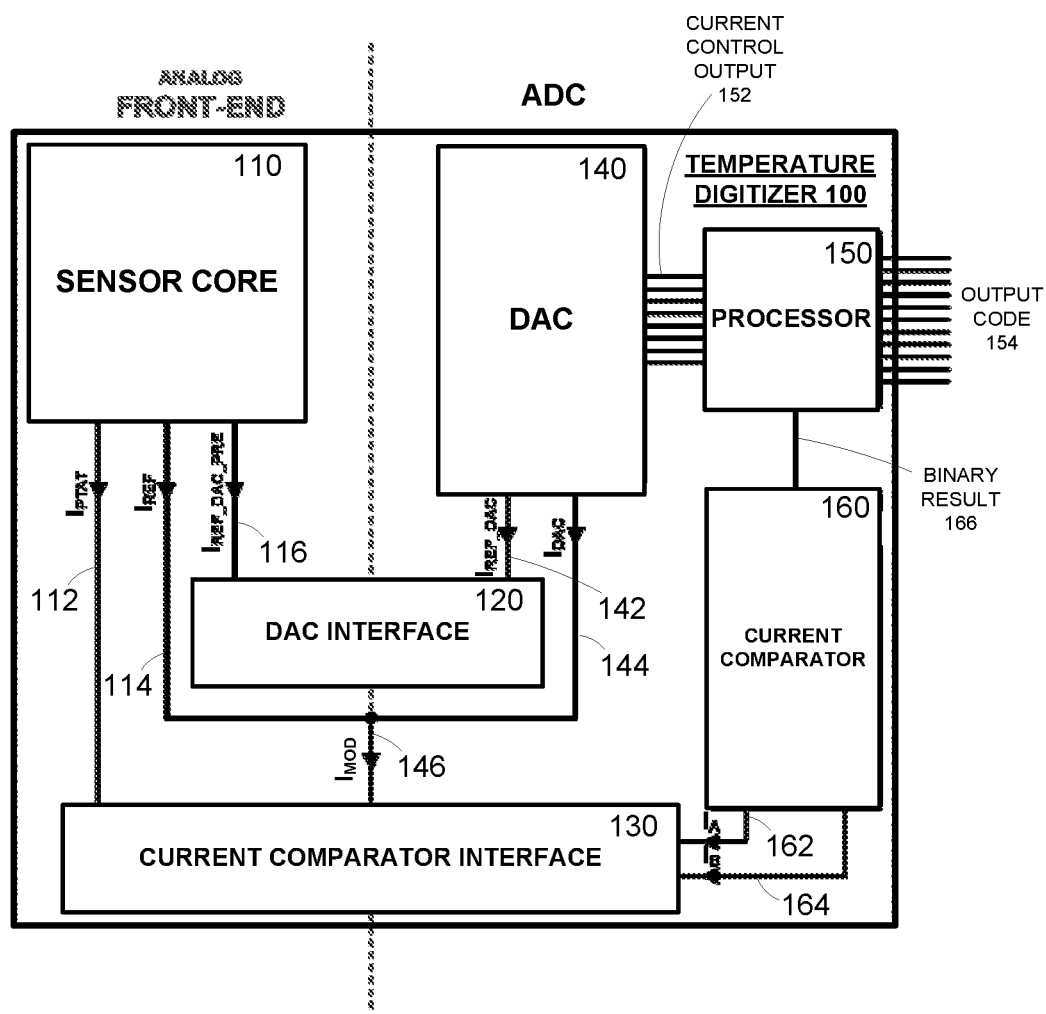
FIG. 1 illustrates an example temperature digitizer, in accordance with various embodiments of this disclosure.

FIG. 1 illustrates an example temperature digitizer 100, in accordance with various embodiments of this disclosure. The temperature digitizer 100 includes a sensor core 110, a current comparator 160, a digital to analog converter (DAC) 140, and a processor 150. Furthermore, the illustrated temperature digitizer 100 includes a current comparator interface 130 and a DAC interface 120. In some embodiments, the current comparator interface 130 and the DAC interface 120 can be included within the current comparator 160 and the DAC 140, respectively. A vertical dashed line down the middle of FIG. 1 generally divides an analog front-end portion of the temperature digitizer 100 from an analog to digital converter (ADC) portion of the temperature digitizer 100.

In an example embodiment, the sensor core 110 can comprise a bipolar core including a transistor, such as a bipolar junction transistor (BJT) or a metal-oxide-silicon (MOS) transistor. The DAC 140 can comprise an 8-bit current steering DAC. The processor 150 can comprise a successive approximation register (SAR) logic unit with an 8-bit connection to the DAC 140, as shown, and an 11-bit output by which processor 150 can output an output code 154, as shown. The processor 150 can be configured to conduct oversampling, e.g., 64x oversampling as will be described further herein.

The sensor core 110 can generate multiple output electrical currents, for example, the sensor core 110 can generate a temperature dependent current $I_{PTAT}$ 112, and one or more reference currents, such as $I_{REF}$ 114 and $I_{REF\_DAC\_PRE}$ PRE 116. In some embodiments, the two reference electrical currents $I_{REF}$ 114 and $I_{REF\_DAC\_PRE}$ 116 can comprise first-order temperature independent electrical current signals.

The temperature digitizer 100 can comprise wires or other electrical connectors which carry the illustrated electrical currents from their respective sources to their respective destinations. $I_{PTAT}$ 112 can originate at sensor core 110 and terminate at current comparator interface 130. $I_{REF\_DAC\_PRE}$ 116 can originate at sensor core 110 and terminate at DAC interface 120. $I_{REF}$ 114 can originate at sensor core 110 and terminate at a connection point which combines $I_{REF}$ 114 and $I_{DAC}$ 144, resulting in a modified reference current $I_{MOD}$ 146.

The DAC 140 can also generate electrical currents, for example, a current $I_{REF\_DAC}$ 142 and a controlled electrical current $I_{DAC}$ 144. $I_{REF\_DAC}$ 142 can originate at DAC 140 and terminate at DAC interface 120. Because the DAC interface 120 can be a part of the DAC 140, $I_{REF\_DAC}$ 142 can optionally comprise an internally measurable current within the DAC 140. $I_{REF\_DAC}$ 142 can be equal to, or otherwise proportional to, $I_{REF\_DAC\_PRE}$ 116.

The DAC 140 can be configured to generate the controlled electrical current $I_{DAC}$ 144 based on $I_{REF\_DAC}$ 142 as well as based on a current control output 152 received from the processor 150. Thus the controlled electrical current $I_{DAC}$ 144 can be adjusted based on a first of the two reference electrical currents ($I_{REF\_DAC\_PRE}$ 116), and the controlled electrical current $I_{DAC}$ 144 can be combined with a second of the two reference electrical currents ($I_{REF}$ 114) to generate the modified reference current ($I_{MOD}$ 146).

The temperature digitizer 100 can comprise wires or other electrical connectors which carry the illustrated electrical currents from their respective sources to their respective destinations. $I_{DAC}$ 144 can originate at DAC 140 and terminate at the connection point which combines the reference current $I_{REF}$ 114 and the controlled current $I_{DAC}$ 144, and the combined $I_{REF}$ 114 and $I_{DAC}$ 144 is illustrated as the modified reference current $I_{MOD}$ 146. The modified reference current $I_{MOD}$ 146 can originate at the connection point for $I_{REF}$ 114 and $I_{DAC}$ 144, and $I_{MOD}$ 146 can terminate at the current comparator interface 130.

Currents $I_A$ 162 and $I_B$ 164 are generated inside the current comparator interface 130 and spilled at the current comparator 160 inputs. $I_A$ 162 and $I_B$ 164, respectively, can be equal to, or otherwise proportional to, temperature dependent current $I_{PTAT}$ 112 and modified reference current $I_{MOD}$ 146, respectively. The current comparator 160 can compare $I_A$ 162 and $I_B$ 164 in order to perform a comparison of the temperature dependent current $I_{PTAT}$ 112 and the modified reference current $I_{MOD}$ 146.

The current comparator 160 can generate a binary result 166 based on the comparison of the temperature dependent current $I_{PTAT}$ 112 and modified reference current $I_{MOD}$ 146. For example, if the temperature dependent current $I_{PTAT}$ 112 is larger than the modified reference current $I_{MOD}$ 146, the current comparator 160 can generate a 1 as the binary result 166. If the temperature dependent current $I_{PTAT}$ 112 is smaller than the modified reference current $I_{MOD}$ 146, the current comparator 160 can generate a 0 as the binary result 166. The binary result 166 can be provided to the processor 150.

The processor 150 can initially provide a current control output 152 to the DAC 140, wherein the current control output 152 controls or influences $I_{DAC}$ 144. After the initial current control output 152, the processor 150 can record a corresponding binary result 166. The processor 150 can then use the binary result 166 to determine a next current control output 152, e.g., the processor 150 can calculate the next current control output 152 based on the binary result 166 and a successive approximation algorithm. The processor 150 can provide the next current control output 152 to the DAC 140, to once again control or influence $I_{DAC}$ 144. The modified $I_{DAC}$ 144 leads to a different $I_{MOD}$ 146, which is compared to $I_{PTAT}$ 112 by the current comparator 160, leading to a next binary result 166. The processor 150 can record the next binary result 166 and repeat the process by calculating a subsequent current control output 152.

The processor 150 can repeat the process of recording a binary result 166 of the comparison performed by the current comparator 160, generating a current control output 152 based on the binary result 166, wherein the current control output 152 modifies the controlled electrical current $I_{DAC}$ 144 generated by the DAC 140, and repetitively recording subsequent binary results 166 and generating subsequent current control outputs 152, as many times as needed to generate a digital code comprising a series of binary results 166, e.g., the processor 150 can be configured to repeat the process eight times to record an 8 bit digital code comprising 8 sequential binary results 166.

In some embodiments, the processor 150 can be configured to output the digital code, e.g., the 8-bit digital code, as output code 154. In other embodiments, the processor 150 can be configured to repetitively generate subsequent digital codes, and average the digital code and the subsequent digital codes to identify a higher resolution digital code, e.g., an at least 11 bit digital code. The processor 150 can then output the higher resolution digital output code, as output code 154.

For example, the processor 150 can be configured to record 64 digital codes (e.g., 64 8-bit digital codes) as inputs, and the processor 150 can be configured to then use the 64 digital codes to calculate each output code 154. The processor 150 can process the multiple recorded digital codes, e.g., by performing an averaging operation, in order to calculate the output code 154, e.g., the 11 bit output code 154.

With regard to FIG. 1 in general, embodiments of the illustrated temperature digitizer 100 can be widely applied in various measurement, instrumentation, and control systems. Fabricating a temperature sensor in integrated circuit (IC) technology, according to FIG. 1, is well suited for the volume production of low-cost products. Temperature sensors fabricated in IC technology can be combined with interface electronics on a single chip. Such 'smart' sensors have distinct advantages compared to conventional sensors: they can directly communicate with a microcomputer in a standardized digital format, thus reducing the complexity and increasing the modularity of the system in which they are applied.

Smart temperature sensors are typically limited in accuracy because of two main reasons. To keep production costs low, smart temperature sensors are often produced in standard complementary metal-oxide-semiconductor (CMOS) technology, which has been developed for mainstream digital products, not precision analog products. In addition, to keep production costs low, their temperature error is typically measured (calibrated) and corrected at not more than one temperature. Embodiments according to FIG. 1 can address these limitations.

In an aspect, circuits according to FIG. 1 can be designed to operate substantially in current mode. This promotes simplicity in summing and scaling signals in the current domain, giving rise to an advantage in terms of occupied silicon area; in fact, this approach allows to spare several adding and amplifying circuits inherently required in a voltage domain alternative. In addition, the signals of interest are processed by a lower number of blocks, and so the sources of error that contribute to the outputs are reduced. With a lower amount of contamination of the signals of interest, it is simpler to achieve a higher level of accuracy.

In embodiments wherein sensor core 110 is a BJT, the sensor core 110 can generate the currents needed to properly feed the ADC (on the right side of FIG. 1). This includes a proportional to absolute temperature (PTAT) current 112, which can be an input of the ADC, and two replicas of a first-order temperature independent current 114, 116 which can be used as references to perform the conversion. A single point current-mode trimming circuit can be used to generate the currents 114, 116, to improve the system accuracy level with the goal to achieve minimum nonlinearity of the sensor output characteristic and to keep the global current consumption as low as possible.

The ADC (on the right side of FIG. 1) can be based on a SAR architecture and can comprise a current steering DAC 140, a current comparator 160, and processor 150, such as a SAR logic block, as described above. The current steering DAC 140, whose reference signal can be a properly scaled version of the reference current via the DAC interface 120, drives the current comparator interface 130 by means of a current signal $I_{DAC}$ 144 which is controlled by the processor 150. The current comparator 160 can periodically provide a decision (binary result 166) that rules the behavior of the processor 150 which executes the successive-approximation algorithm. The three blocks included in the ADC can handle 8 bits and thus a single conversion cycle can provide as output an 8 bit digital word, also referred to herein as a digital code. To refine the resolution, oversampling can be used in order to achieve an 11 bit code, by averaging the 8 bit codes of 64 conversions.

Figure 2:
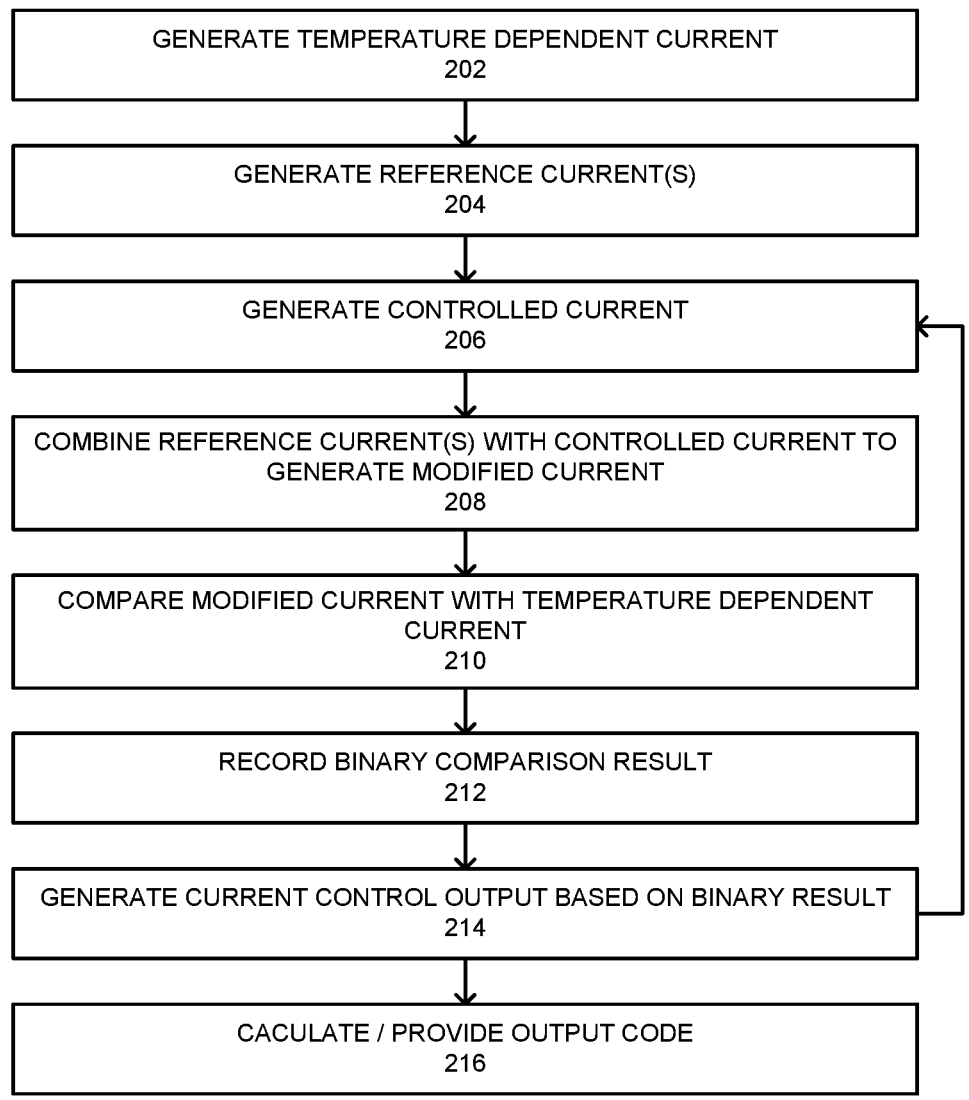
FIG. 2 illustrates an example temperature digitizer method, in accordance with various embodiments of this disclosure.

FIG. 2 illustrates an example temperature digitizer method, in accordance with various embodiments of this disclosure. For simplicity of explanation, the illustrated method is depicted and described as a series of acts. It is to be understood and appreciated that various embodiments disclosed herein need not be limited by the acts illustrated and/or by the order of acts. For example, acts can occur in various orders and/or concurrently, and with other acts not presented or described herein. Furthermore, not all illustrated acts may be required to implement methodologies in accordance with the disclosed subject matter. In addition, those skilled in the art will understand and appreciate that the methods illustrated herein could alternatively be represented as a series of interrelated states via a state diagram or events.

Operations 202 and 204 can be performed by the sensor core 110 illustrated in FIG. 1. At 202, the sensor core 110 can generate a temperature dependent electrical current, e.g., $I_{PTAT}$ 112. At 204, the sensor core 110 can generate at least one reference electrical current, such as $I_{REF}$ 114 and $I_{REF\_DAC\_PRE}$ 116.

The remaining operations 206-216 can be performed by the processor 150, DAC 140, and current comparator 160 and their respective interfaces illustrated in FIG. 1. In general, multiple digital codes can be generated by multiple repetitions of operations 206-214, and after the multiple digital codes are generated, the multiple digital codes can be used to calculate and provide an output code at operation 216.

At 206, the DAC 140 can generate a controlled electrical current $I_{DAC}$ 144. At 208, the controlled electrical current $I_{DAC}$ 144 can be combined with the at least one reference current $I_{REF}$ 114 to generate a modified reference current $I_{MOD}$ 146.

At 210, the current comparator 160 can perform a comparison of the modified reference current $I_{MOD}$ 146 and the temperature dependent electrical current $I_{PTAT}$ 112. The current comparator 160 can output a binary result 166 to the processor 150.

At 212, the processor 150 can record a binary result 166 of the comparison performed at operation 210. At 214, the processor 150 can generate a current control output 152 based on the binary result 166 and a successive approximation algorithm, discussed further in connection with FIG. 7. The current control output 152 can modify the controlled electrical current 144. Operations 206-214 can be repeated in a loop, as indicated by the arrow from box 214 back to box 206, in order to repetitively record subsequent binary results 166 and generate subsequent current control outputs 152 to generate a digital code comprising a series of binary results 166.

After the digital code is generated, at 216, the processor 150 can optionally provide the digital code as the output code 154, wherein the output code 154 can be provided to any component that is coupled with the temperature digitizer 100 via the interface illustrated in FIG. 1 (illustrated as an 11 bit output code interface). Alternatively, the processor 150 can cause operations 206-214 to be repeated still further in order to repetitively generate subsequent digital codes, and, at 216, the processor 150 can average the digital code and the subsequent digital codes (or otherwise process the digital codes) to identify an enhanced digital code, e.g., an at least eleven bit digital code. The processor 150 can output the enhanced digital code as the output code 154.

With regard to FIG. 2 in general, in some embodiments, methods according to this disclosure can include generating a temperature dependent current-domain signal and two replicas of a first-order temperature independent current signal (references) by means of a BJT-based circuit.

Methods can furthermore include, during a single conversion repetition: in response to a digital output, comparing the temperature dependent current-varying signal with one of the two references plus the other reference scaled by a factor depending on a successive-approximation algorithm. This step can be iterated multiple times, e.g., 8 times to get an 8 bit digital word.

Furthermore, methods can repeat the conversion repetition, e.g., 64 times, storing the resulting 64 8 bit digital words which differ from each other due to the presence of noise. Finally, methods can include computing the average of the 64 samples, thereby resolving 3 additional bits. The resulting 11 bit digital code is proportional to the temperature dependent current-domain signal.

Figure 3:
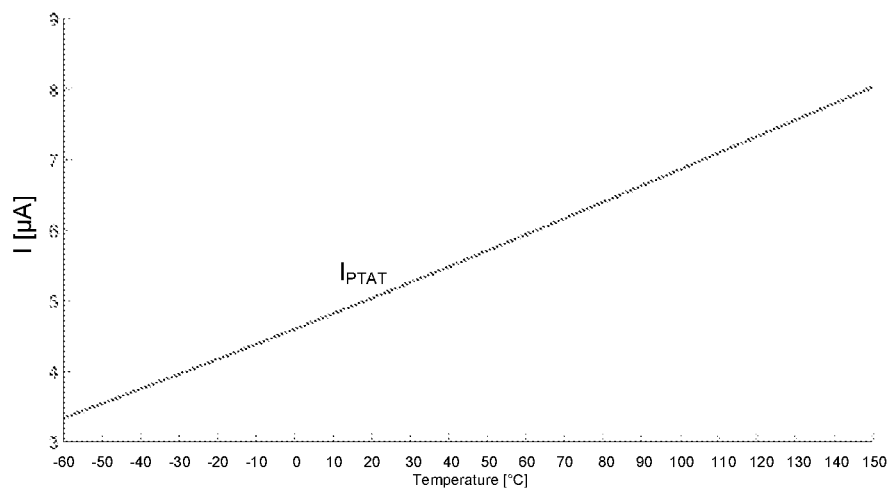
FIG. 3 illustrates an example temperature dependent electrical current, in accordance with various embodiments of this disclosure.

FIG. 3 illustrates an example temperature dependent electrical current, in accordance with various embodiments of this disclosure. FIG. 3 is a graph showing the temperature dependent electrical current $I_{PTAT}$, in micro amps (µA) at different temperatures ranging from −60° Celsius (C) to 150° C. As can be seen, a sensor core 110 can output different temperature dependent electrical currents at different temperatures.

Figure 4:
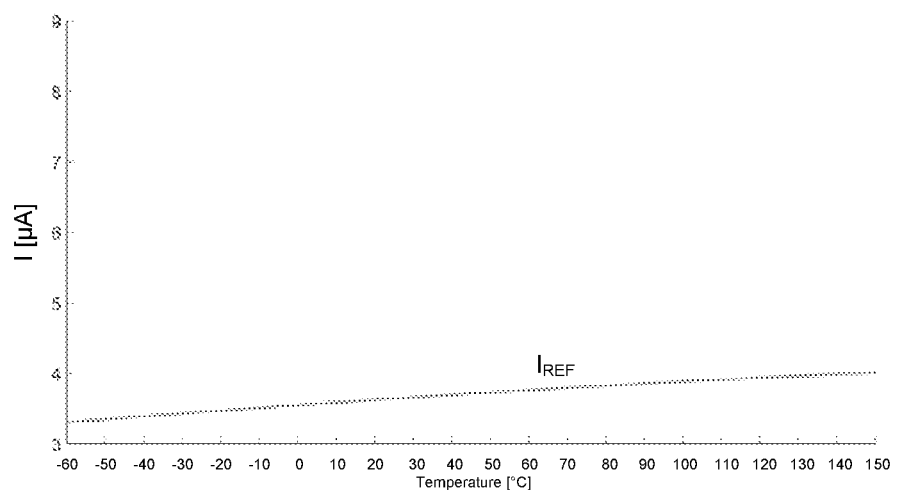
FIG. 4 illustrates an example reference electrical current, in accordance with various embodiments of this disclosure.

FIG. 4 illustrates an example reference electrical current, in accordance with various embodiments of this disclosure. FIG. 4 is a graph showing a reference electrical current $I_{REF}$, in µA at different temperatures ranging from −60° C. to 150° C. The illustrated $I_{REF}$ can represent currents $I_{REF}$ 114 and/or $I_{REF\_DAC\_PRE}$ 116 introduced in FIG. 1. $I_{REF}$ can be considered as a first-order temperature independent electrical current signal, which can display a small positive linear temperature dependence, which results in a non-linearity that can be turned to compensate for the second-order non-linearity originated from the curvature of the voltage that falls between the base and emitter (VBE) of a transistor within the sensor core 110.

Figure 5:
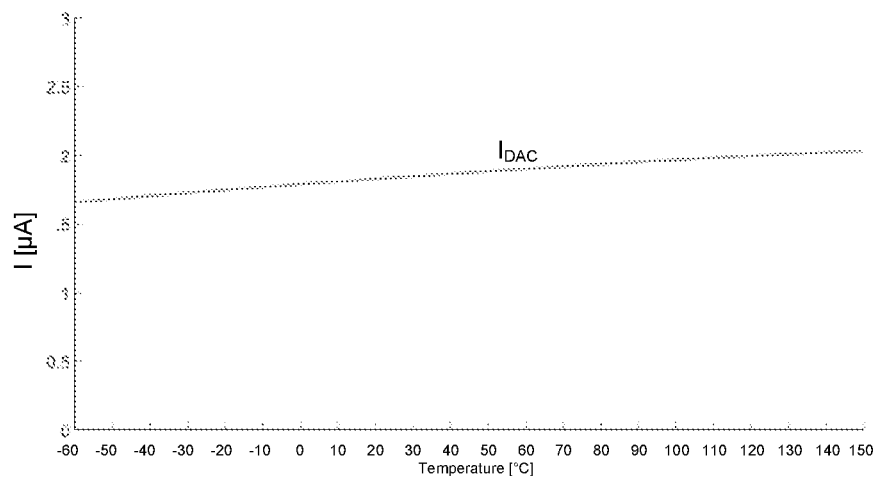
FIG. 5 illustrates an example controlled electrical current, in accordance with various embodiments of this disclosure.

FIG. 5 illustrates an example controlled electrical current, in accordance with various embodiments of this disclosure. FIG. 5 is a graph showing the controlled electrical current $I_{DAC}$, in µA at different temperatures ranging from −60° C. to 150° C. FIG. 5 shows a controlled electrical current $I_{DAC}$ which can be generated based on one current control output 152, understanding that different current control outputs 152 can be used to change $I_{DAC}$, however, the slope and linearity of $I_{DAC}$ will be similar at different current magnitudes.

Figure 6:
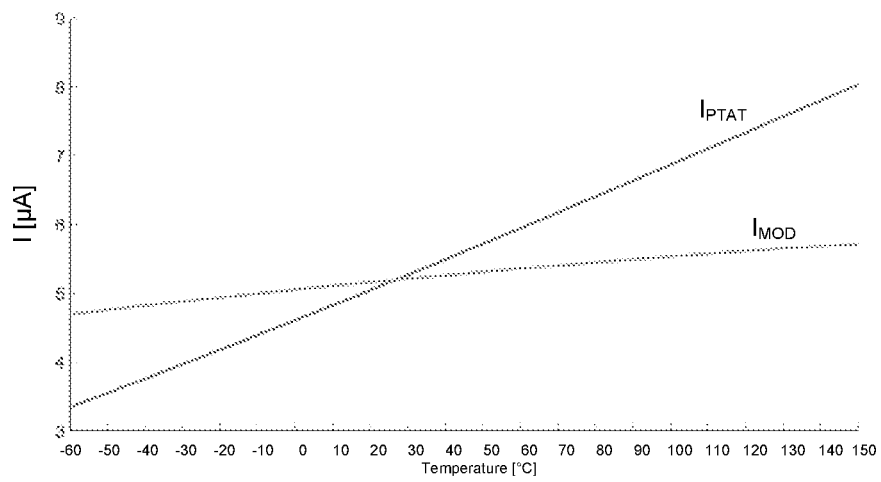
FIG. 6 illustrates an example temperature dependent electrical current and an example modified reference current, in accordance with various embodiments of this disclosure.

FIG. 6 illustrates an example temperature dependent electrical current and an example modified reference current, in accordance with various embodiments of this disclosure. FIG. 6 is a graph showing the temperature dependent electrical current $I_{PTAT}$, in µA at different temperatures ranging from −60° C. to 150° C., as introduced in FIG. 3, along with a modified reference current $I_{MOD}$ also in µA at temperatures ranging from −60° C. to 150° C. $I_{MOD}$ can comprise a combination of $I_{DAC}$ (FIG. 5) and $I_{REF}$ (FIG. 4), as described herein. As such, $I_{MOD}$, like $I_{DAC}$, can have different values (effectively moving $I_{MOD}$ up or down on the vertical axis) at a given temperature depending on the current control output 152. As can be observed in FIG. 6, $I_{PTAT}$ can be compared with $I_{MOD}$ at a given temperature, e.g., by current comparator 160. Current comparator 160 can generate a first binary result 166 if $I_{PTAT}$ is larger than $I_{MOD}$, or a second (opposite) binary result 166 if $I_{PTAT}$ is smaller than $I_{MOD}$.

Figure 7:
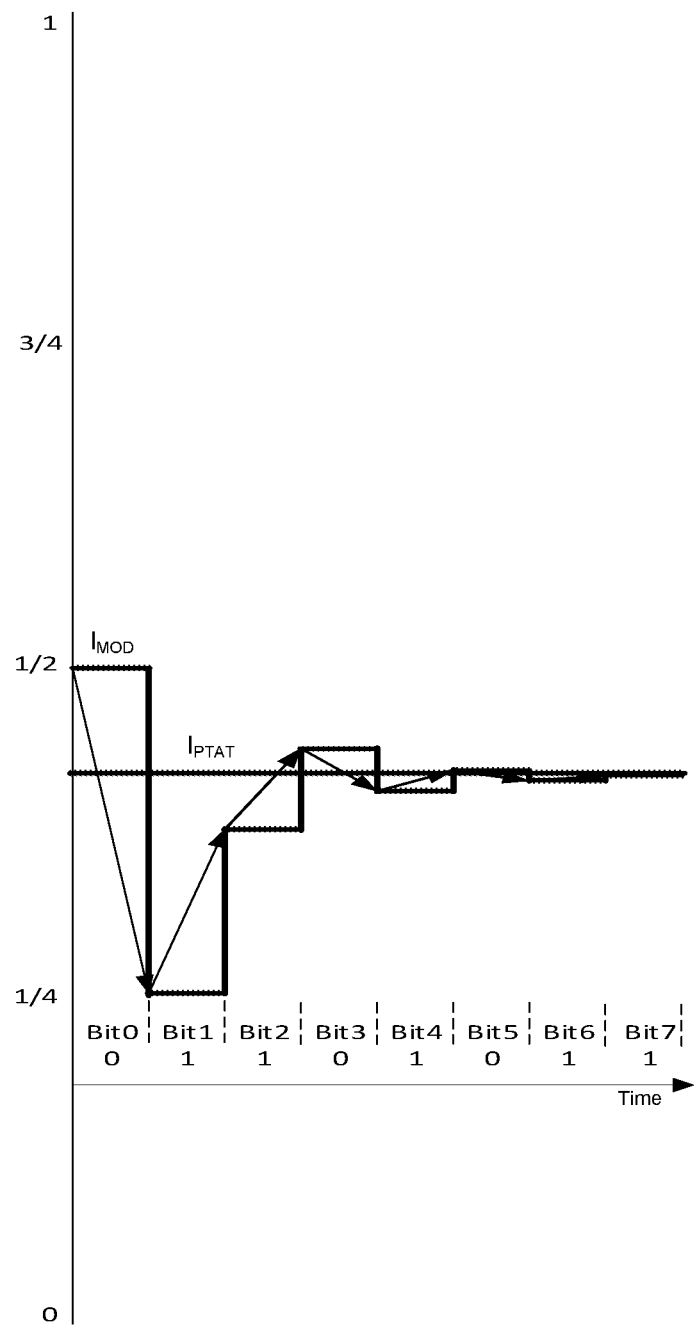
FIG. 7 illustrates multiple sequential modifications of a modified reference current and corresponding comparisons of a temperature dependent electrical current with the modified reference current, yielding multiple sequential binary results, in accordance with various embodiments of this disclosure.

FIG. 7 illustrates multiple sequential modifications of a modified reference current and corresponding comparisons of a temperature dependent electrical current with the modified reference current, yielding multiple sequential binary results, in accordance with various embodiments of this disclosure. FIG. 7 is a graph showing an example modified reference current ($I_{MOD}$) and an example temperature dependent electrical current ($I_{PTAT}$) over time, where time is represented on the horizontal axis. FIG. 7 presumes a constant temperature throughout multiple operations that modify $I_{MOD}$, therefore, $I_{PTAT}$ is illustrated as a straight horizontal line, while $I_{MOD}$ changes over time in response to different control inputs.

As can be understood by reference to FIG. 7, processor 150 can use a successive approximation algorithm to set a first current control output 152, resulting in a first $I_{MOD}$ current (at the left side of FIG. 7). The illustrated first $I_{MOD}$ current is represented as ½. The current comparator 160 can then compare the first $I_{MOD}$ current with $I_{PTAT}$. In this example, the $I_{PTAT}$ is less than the first $I_{MOD}$, and so a first binary result 166 of the comparison can be a 0, as illustrated in FIG. 7 underneath the graphed currents. If $I_{PTAT}$ had been more than first $I_{MOD}$, the first binary result 166 of the comparison could instead be a 1. In this example, the processor 150 can store the binary result (0) in the first bit position (Bit 0).

Next, the processor 150 can use the successive approximation algorithm to set a second current control output 152, resulting in a second $I_{MOD}$ current. The successive approximation algorithm can cause the processor 150 to adjust $I_{MOD}$ one half step down when the previous binary result indicated that $I_{PTAT}$ was less than the first $I_{MOD}$ (as in this example). In an opposite example, the successive approximation algorithm can cause the processor 150 to adjust $I_{MOD}$ one half step up when a previous binary result (1) indicated that $I_{PTAT}$ was more than first $I_{MOD}$. Returning to the illustrated example, the successive approximation algorithm can cause the processor 150 to adjust $I_{MOD}$ one half step down, namely, to ¼. Second $I_{MOD}$ current is therefore represented in FIG. 7 as ¼, which is one half step down from the previous $I_{MOD}$ value of ½. The current comparator 160 can then compare the second $I_{MOD}$ current with $I_{PTAT}$. In this example, the $I_{PTAT}$ is more than the second $I_{MOD}$, and so a second binary result 166 of the comparison can be a 1. Again, other values can be arrived at in other examples. In this example, the processor 150 can store the second binary result in the second bit position (Bit 1).

Next, the processor 150 can use the successive approximation algorithm to set a third current control output 152, resulting in a third $I_{MOD}$ current. The successive approximation algorithm can cause the processor 150 to adjust $I_{MOD}$ one half step up this time, because when the previous binary result indicated that $I_{PTAT}$ was more than second $I_{MOD}$. The successive approximation algorithm can cause the processor 150 to adjust $I_{MOD}$ one half step up, namely, to ⅜. The third $I_{MOD}$ current is therefore represented in FIG. 7 as ⅜, which is which is one half step up from the previous $I_{MOD}$ value of ¼. Note that the half step is half of the previous step, so successive half steps are smaller with each repetition. The current comparator 160 can then compare the third $I_{MOD}$ current with $I_{PTAT}$. In this example, the $I_{PTAT}$ is more than third $I_{MOD}$, and so a third binary result 166 of the comparison can be a 1. Again, other values can be arrived at in other examples. In this example, the processor 150 can store the third binary result in the third bit position (Bit 2).

The above procedure can be repeated until all 8 bits are determined. In general, the successive approximation algorithm can effect an adjustment of the modified reference current $I_{MOD}$, wherein the adjustment moves $I_{MOD}$ in the direction of $I_{PTAT}$, and wherein the magnitude of the adjustment is a fraction (such as one half, or any other fraction) of a previous adjustment. In this manner, $I_{MOD}$ becomes successively closer to $I_{PTAT}$ with each adjustment. As a result, the digital code (in this example, 01101011) is representative of $I_{PTAT}$, which is representative of the temperature.

Figure 8:
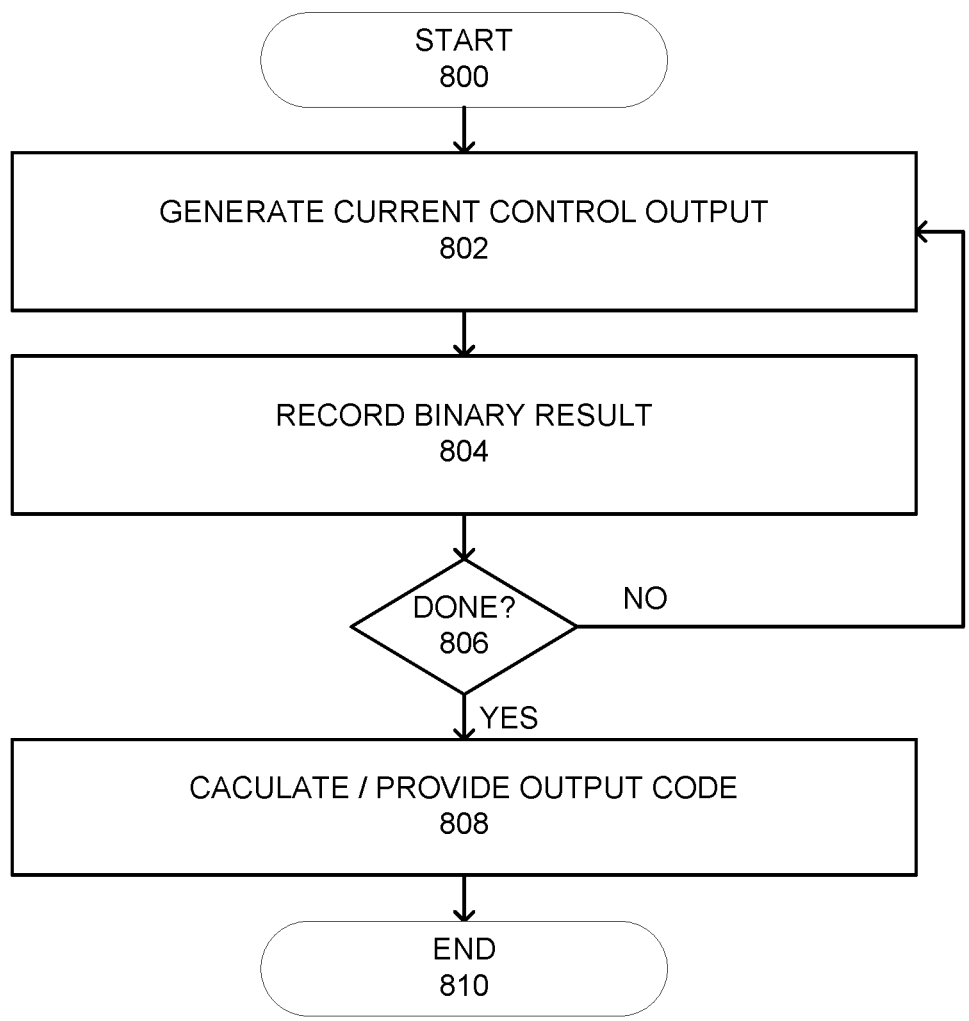
FIG. 8 illustrates an example method performed by a logic component of a temperature digitizer, in accordance with various embodiments of this disclosure.

FIG. 8 illustrates an example method performed by a logic component of a temperature digitizer, in accordance with various embodiments of this disclosure. For simplicity of explanation, the illustrated method is depicted and described as a series of acts. It is to be understood and appreciated that various embodiments disclosed herein need not be limited by the acts illustrated and/or by the order of acts. For example, acts can occur in various orders and/or concurrently, and with other acts not presented or described herein. Furthermore, not all illustrated acts may be required to implement methodologies in accordance with the disclosed subject matter. In addition, those skilled in the art will understand and appreciate that the methods illustrated herein could alternatively be represented as a series of interrelated states via a state diagram or events.

The operations illustrated in FIG. 8 can be performed, e.g., by the processor 150 illustrated in FIG. 1. AT 800, the processor 150 can initiate a temperature measurement operation. At 802, the processor 150 can use a successive approximation algorithm, such as described in connection with FIG. 7, to generate a current control output 152. The first current control output 152 results in a first $I_{MOD}$, which is compared with $I_{PTAT}$, resulting in a binary result 166. At 804, the processor 150 can record the binary result 166. At 806, the processor 150 can determine if recording of binary results is done, e.g., if all 8 bits of a digital code have been recorded, or in some embodiments, if all of the bits for multiple digital codes (e.g., 64 digital codes) have been recorded.

If not done at 806, then the processor 150 returns to operation 802 and uses the successive approximation algorithm to generate a next current control output 152 based on the previous binary result 166. The processor 150 can then repeat operation 804 to record the next binary result 166, followed by operation 806. The processor 150 can repeat operations 802-806 as needed until the processor 150 determines that it is done (all bits are recorded) at operation 806.

If done at 806, then at 808 the processor 150 can calculate/provide an output code 154. In embodiments wherein the processor 150 generates a single digital code, the processor 150 can output the single digital code as the output code 154 without further processing. In embodiments wherein the processor 150 generates multiple digital codes, the processor 150 can combine the multiple digital codes to determine an enhanced accuracy digital code (e.g., an eleven bit digital code can be calculated from 64 eight bit digital codes), and the processor 150 can output the enhanced accuracy digital code as the output code 154. The processor 150 can end at 810, the temperature digitization is complete. Further temperature digitization operations can be performed by re-starting operations at 800.

Figure 9:
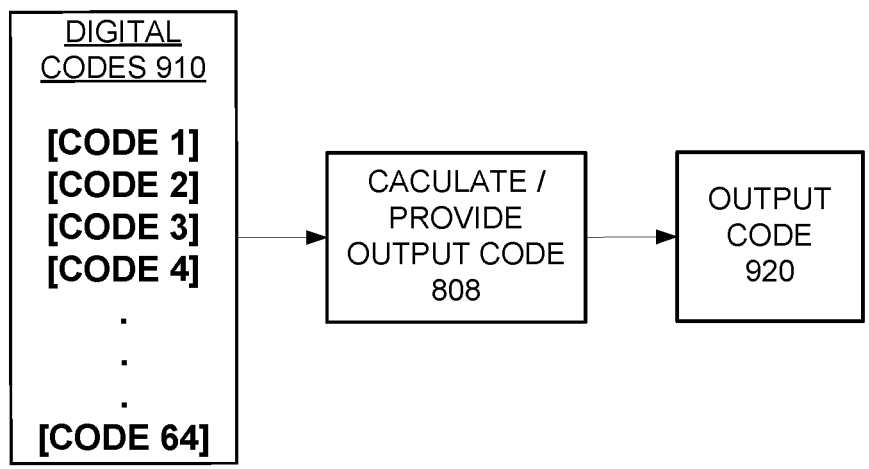
FIG. 9 illustrates processing multiple digital codes to produce an output code, in accordance with various embodiments of this disclosure.

FIG. 9 illustrates processing multiple digital codes to produce an output code, in accordance with various embodiments of this disclosure. Digital codes 910 including code 1, code 2, code 3, code 4 . . . code 64 can be recorded by the processor 150. Each of the digital codes 910 can comprise, e.g., an 8 bit code generate by 8 current comparison operations, as described herein. The digital codes 910 can be processed by a calculate/provide output code block 808, introduced in FIG. 8. A variety of different processing approaches can be used at 808. Some embodiments can use averaging operations to determine an enhanced accuracy average of the digital codes 910. The resulting enhanced accuracy average can comprise a digital code having more bits than the input digital codes 910, e.g., 11 bits. The enhanced accuracy digital code can be output as output code 920.

As employed in the subject specification, the term "component" refers to substantially any analog and/or digital based device(s), circuit(s), etc. comprising, e.g., a resistor, a capacitor, a transistor, a diode, an inductor, a memory, a programmable device, e.g., fuse, field programmable gate array (FPGA), complex programmable logic device (CPLD), etc. relevant to performing operations and/or functions of circuit(s), device(s), system(s), etc. disclosed herein. Further, the terms "processing component", "control unit component", "control unit", and "arithmetic logic unit (ALU)" can refer to substantially any computing processing unit or device (e.g., MAC, etc.), comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an ASIC, a digital signal processor (DSP), an FPGA, a programmable logic controller (PLC), a CPLD, a discrete gate or transistor logic, discrete hardware components, an analog circuit, or any combination thereof designed to perform the functions and/or processes described herein. Further, a processor can exploit nano-scale architectures such as, but not limited to, molecular and quantum-dot based transistors, switches and gates, e.g., in order to optimize space usage or enhance performance of mobile devices. A processor can also be implemented as a combination of computing processing units, devices, etc.

In the subject specification, the term "memory", "memory component", "lookup table (LUT)" and substantially any other information storage component relevant to operation and functionality of the devices disclosed herein refer to "memory components," or entities embodied in a "memory," or components comprising the memory. It will be appreciated that the memory can include volatile memory and/or nonvolatile memory. By way of illustration, and not limitation, volatile memory, can include random access memory (RAM), which can act as external cache memory. By way of illustration and not limitation, RAM can include synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM). In other embodiment(s) nonvolatile memory can include read only memory (ROM), programmable ROM (PROM), electrically programmable ROM (EPROM), electrically erasable ROM (EEPROM), or flash memory. Additionally, the components and/or devices disclosed herein can comprise, without being limited to comprising, these and any other suitable types of memory.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Aspects of systems, apparatus, devices, processes, and process blocks explained herein can be embodied within hardware, such as an ASIC or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The above description of illustrated embodiments of the subject disclosure is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A temperature digitizer, comprising:
a sensor core, wherein the sensor core is configured to generate a temperature dependent electrical current and at least one reference electrical current, wherein the temperature dependent electrical current and the at least one reference electrical current originate from a sensing device at the sensor core;
a digital to analog converter, coupled to the sensor core, wherein the digital to analog converter is configured to generate a controlled electrical current which is combined with the at least one reference current to generate a modified reference current;
a current comparator, wherein the current comparator is configured to perform a comparison of the modified reference current and the temperature dependent electrical current and to generate a binary result of the comparison; and
a processor, wherein the processor is configured to:
record the binary result of the comparison provided by the current comparator;
generate a current control output based on the binary result and provide the current control output to the digital to analog converter, wherein the current control output modifies the controlled electrical current generated by the digital to analog converter;
repetitively record subsequent binary results and generate subsequent current control outputs to generate a digital code comprising a series of binary results; and
output the digital code.

2. The temperature digitizer of claim 1, wherein the sensor core comprises a bipolar junction transistor.

3. The temperature digitizer of claim 1, wherein the sensor core is configured to generate two reference electrical currents, and wherein the two reference electrical currents comprise first-order temperature independent electrical current signals.

4. The temperature digitizer of claim 3, wherein the controlled electrical current is adjusted based on a first of the two reference electrical currents, and wherein the controlled electrical current is combined with a second of the two reference electrical currents to generate the modified reference current.

5. The temperature digitizer of claim 1, wherein the digital code comprises an at least eight bit digital code.

6. The temperature digitizer of claim 5, wherein the processor is further configured to repetitively generate subsequent digital codes and average the digital code and the subsequent digital codes to identify an at least eleven bit digital code, and wherein the digital code output by the processor comprises the eleven bit digital code.

7. The temperature digitizer of claim 1, wherein the current control output based on the binary result is calculated based on the binary result and a successive approximation algorithm.

8. The temperature digitizer of claim 1, wherein the processor comprises a successive approximation register logic unit.

9. The temperature digitizer of claim 1, wherein the digital to analog converter comprises an eight bit current steering digital to analog converter.

10. A method to generate digitized temperature data, comprising:
generating a temperature dependent electrical current and at least one reference electrical current with a sensor core, wherein the temperature dependent electrical current and the at least one reference electrical current originate from a sensing device at the sensor core;
generating, with a digital to analog converter, coupled to the sensor core, a controlled electrical current which is combined with the at least one reference current to generate a modified reference current;
performing, with a current comparator, a comparison of the modified reference current and the temperature dependent electrical current to generate a binary result of the comparison;
recording, with a processor, the binary result of the comparison;
generating a current control output based on the binary result to provide the current control output to the digital to analog converter, wherein the current control output modifies the controlled electrical current;
repetitively recording subsequent binary results and generating subsequent current control outputs to generate a digital code comprising a series of binary results; and
outputting the digital code.

11. The method to generate digitized temperature data of claim 10, wherein a bipolar junction transistor is used to generate the temperature dependent electrical current and the at least one reference electrical current.

12. The method to generate digitized temperature data of claim 10, wherein an eight bit current steering digital to analog converter is used to generate the controlled electrical current.

13. The method to generate digitized temperature data of claim 10, wherein a current comparator is used to perform the comparison of the modified reference current and the temperature dependent electrical current.

14. The method to generate digitized temperature data of claim 10, wherein a successive approximation register logic unit is used to record the binary result of the comparison, generate the current control output based on the binary result, repetitively record the subsequent binary results and generate the subsequent current control outputs, and output the digital code.

15. The method to generate digitized temperature data of claim 10, wherein the at least one reference electrical current comprises two reference electrical currents, wherein the controlled electrical current is combined with a second of the two reference electrical currents to generate the modified reference current.

16. The method to generate digitized temperature data of claim 15, wherein the two reference electrical currents comprise first-order temperature independent electrical current signals.

17. The method to generate digitized temperature data of claim 10, wherein the digital code comprises an at least eight bit digital code.

18. The method to generate digitized temperature data of claim 10, further comprising repetitively generating subsequent digital codes and averaging the digital code and the subsequent digital codes to identify an at least eleven bit digital code, and wherein the digital code output comprises the eleven bit digital code.

19. The method to generate digitized temperature data of claim 10, wherein generating the current control output based on the binary result comprises calculating the current control output based on the binary result and a successive approximation algorithm.

\* \* \* \* \*